United States Patent [19]

Niedermeyer

[11] 4,416,263

[45] Nov. 22, 1983

[54] HIGH RATIO SOLAR ENERGY LINEAR TYPE CONCENTRATING COLLECTOR

[76] Inventor: William P. Niedermeyer, 1024 Mt. Mary Dr., Green Bay, Wis. 54301

[21] Appl. No.: 340,065

[22] Filed: Jan. 18, 1982

Related U.S. Application Data

[63] Continuation-in-part of Ser. No. 329,389, Dec. 10, 1981, which is a continuation of Ser. No. 171,097, Jul. 22, 1980, Pat. No. 4,340,031.

[51] Int. Cl.³ .............................. F24J 3/02; G02B 5/08
[52] U.S. Cl. .................................. 126/438; 350/295; 350/310
[58] Field of Search ............... 126/417, 438, 439, 450, 126/451; 350/295, 298, 310

[56] References Cited

U.S. PATENT DOCUMENTS

| | | | |
|---|---|---|---|
| 3,628,852 | 12/1971 | Snaper | 350/295 |
| 3,733,116 | 5/1973 | Hutchinson | 350/310 |
| 3,827,782 | 8/1974 | Boudoris | 350/295 |
| 3,841,738 | 10/1974 | Caplan | 126/438 |
| 3,874,773 | 4/1975 | Kurz | 350/310 |
| 3,906,927 | 9/1975 | Caplan | 126/438 |
| 4,056,309 | 11/1977 | Harbison et al. | 126/438 |
| 4,066,344 | 1/1978 | Talapatra | 350/310 |
| 4,087,682 | 5/1978 | Kolodziej | 350/295 |
| 4,093,351 | 6/1978 | Perkins et al. | 350/295 |
| 4,106,484 | 8/1978 | Dame | 126/438 |
| 4,136,671 | 1/1979 | Whiteford | 126/438 |
| 4,161,942 | 7/1979 | Monk | 126/438 |
| 4,175,835 | 11/1979 | Kuhn | 350/310 |
| 4,238,265 | 12/1980 | Deminet | 350/310 |
| 4,266,857 | 5/1981 | Svenson | 350/295 |
| 4,293,192 | 10/1981 | Bronstein | 350/310 |
| 4,331,383 | 5/1982 | Christiansen | 350/310 |

*Primary Examiner*—Daniel J. O'Connor
*Attorney, Agent, or Firm*—Francis J. Bouda

[57] ABSTRACT

A solar energy concentrating collector has a concave parabolic reflective member supported on a plurality of shaped support assemblages, which are parabolically shaped on the top and extend transversely in a direction perpendicular to the axis of the collector.

Each assemblage has a vertical planar support and also a flexible member. The flexible member has a top for supporting the reflective member and an appendage affixed to the top and extending away therefrom into operative engagement with the vertical planar support.

The top of the flexible member can be moved against a template having a parabolically shaped bottom surface. The space between the top of the flexible member and the top edge of the planar support is bridged by the vertical downwardly extending appendages which are fastened to the support after the top has been properly positioned. The flexible member thus provides a correct concave upper surface having a parabolic shape that matches the accuracy of the template.

24 Claims, 11 Drawing Figures

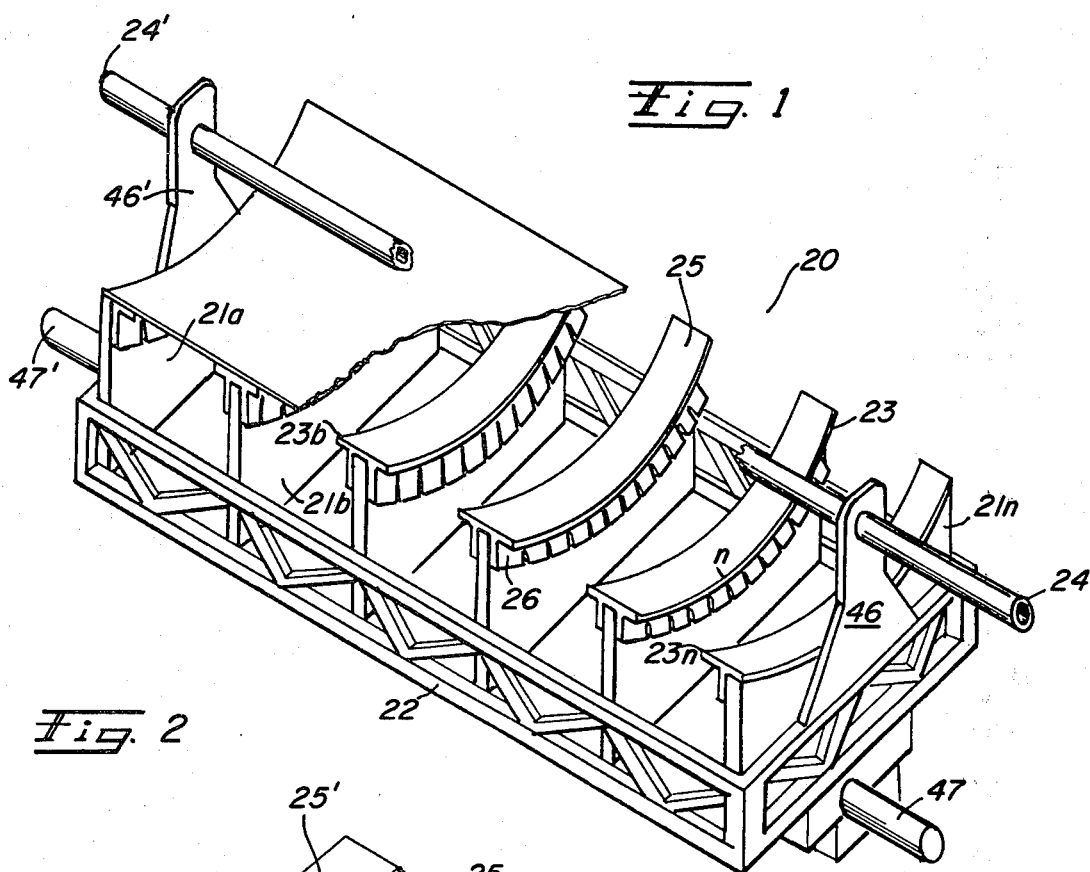
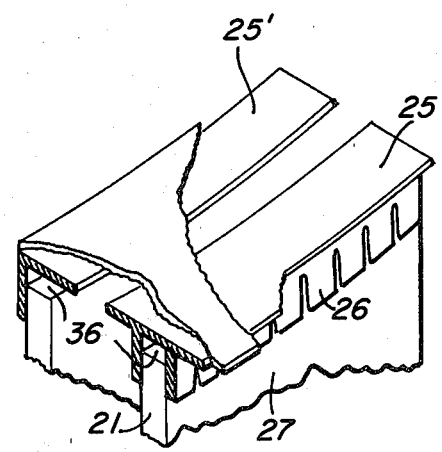
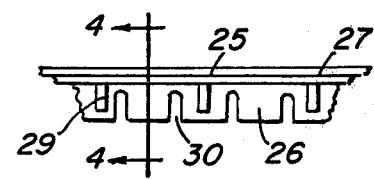
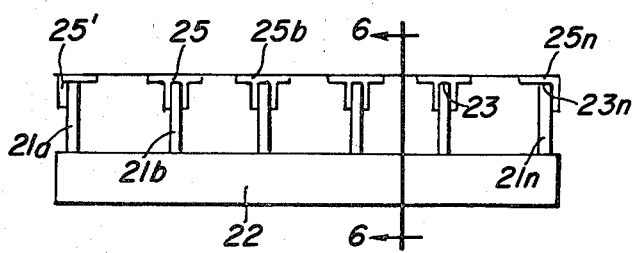

HIGH RATIO SOLAR ENERGY LINEAR TYPE CONCENTRATING COLLECTOR

BACKGROUND OF THE INVENTION

This invention is directed toward linear parabolic solar energy collectors and is a continuation-in-part of my co-pending U.S. patent application Ser. No. 329,389, which Dec. 10, 1981 is a continuation of Ser. No. 171,097, July 22, 1980 now U.S. Pat. No. 4,340,031.

In my U.S. Pat. No. 4,190,037, I teach the use of transverse spaced supports having parabolically shaped top edges to support a bendable reflective surface in parabolic shape. I also disclose therein high speed means for cutting an accurate parabolic curve from low density materials. I describe methods for producing the support in my U.S. Pat. No. 4,266,112.

The collectors of U.S. Pat. No. 4,190,037 can be fabricated cost effectively if the transverse supports are made from plastic fiber reinforced corrugated paperboard or expanded foam plastics, etc., when such materials can be processed in sheet form on a continuous basis.

For certain applications, metal or combination metal/plastic materials have properties that yield structural advantages for maintaining high focal accuracy over a wide range of operating temperatures and weather conditions as well as high wind loads without distortion.

This invention addresses the problems associated with close tolerance fabrication and assembly when metal materials are used for supports. As distinguished over U.S. Pat. No. 4,190,037, this invention uses a flexible movable piece which is adjusted to parabolic accuracy after installation, rather than the abutment means required in the previously patented designs.

Typical linear type concentrating solar energy collectors made of metal are described in U.S. Pat. Nos. 4,135,493 and 4,240,406. In these conventional parabolic collectors, precise machining (or fabrication) of the top parabolic contour of the supports is required to attain high ratio concentration of solar rays at the focal line of the collector.

In addition to the close machining tolerances required for the support components, careful and precise assembly positioning is required to locate these components in position relative to the central focal line.

In the designs of U.S. Ser. No. 171,092 (now U.S. Pat. No. 4,340,031) the requirement for accurate placement of parabolic supports was recognized by reciting a notch or reference edge in the support for abutment and alignment symmetrical with the axis of the collector.

The present invention describes linear parabolic collector designs which utilize a unique flexible member to achieve final design accuracy, even in the event of fabrication and/or assembly inaccuracies.

In essence, the collectors do not require costly and time consuming close tolerance machining of components or accurate assembly since the penultimate step involves adjustment of the flexible piece to compensate for accumulated inaccuracies.

While metal or metal/plastic combination materials are discussed above, it will be recognized that the principles and components described apply to any material. The essential teaching of this invention resides in the advantageous use of a flexible piece over the top of a support and its slideable relationship therewith.

The primary object of this invention is to provide a highly accurate linear parabolic collector wherein components do not require close tolerance fabrication or machining.

A further object of this invention is to provide a means to compensate for inaccuracies that result from non-precision alignment of parts during assembly.

With the above and other objects in view, more information and understanding of the present invention may be achieved by reference to the following detailed description.

DETAILED DESCRIPTION

For the purpose of illustrating the invention, there is shown in the accompanying drawings a form thereof which is at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

FIG. 1 is a perspective view with portions of the reflective surface cut away to show the essential components and the communicating relationship between the planar supports and the flexible top used to achieve parabolic accuracy.

FIG. 2 is a perspective view of the outer portions of a support assemblage.

FIG. 3 is a side elevation of a typical flexible member.

FIG. 4 is a cross section taken along line 4—4 of FIG. 3.

FIG. 5 is a front elevational view of the assemblage of FIG. 1.

FIG. 1 shows a typical linear parabolic reflector type solar energy concentrating collector 20 according to this invention. In the following descriptions, the beneficial use of a fleixble top piece will distinguish over state of the art collectors.

Figure 6:
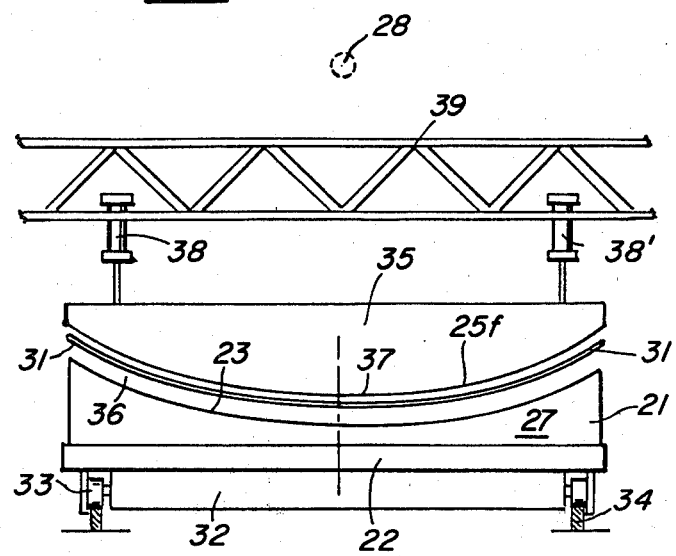
FIG. 6 is an end elevational view showing the cooperating use of a template to adjust the final parabolic curve of the support structure.

A plurality of vertical planar supports $21a \ldots 21_n$ are positioned in a suitable frame or trusswork 22 such that the nadir n of the curved top edge 23 is in a plane passing through the centerline or axis 24—24' of the linear parabolic collector.

U.S. Pat. No. 4,190,037 discloses a similar planar vertical support in which the top edge $23 \ldots 23_n$ of each support was very accurately cut in parabolic shape according to methods of my U.S. Pat. No. 4,266,112. This invention, however, does not require that the top edges 23 . . . 23$_n$ be cut accurately, nor in parabolic shape, since a flexible piece 25 having downwardly extending tab portions or appendages 26 is used to achieve final parabolic shape.

The method of final adjustment of the flexible piece is clearly illustrated in FIG. 6 and is discussed in detail hereafter.

Reflective surface 27 (cut away in FIG. 1 for clarity of underlying detail) directs solar rays to be focused and concentrated on the absorptively covered heat transfer fluid conduit 28.

FIG. 2 shows a fragmentary portion of a typical support 21 with the flexible member 25 straddling the support 27. In this instance, both an inverted "U" shaped flexible member 25 and an "L" shaped member 25' are used, but it is understood that other shapes, for example, a "T" shape, can be used since they also have at least one downwardly extending appendage that can be moved vertically relative to vertical planar support 27 and then attached thereto. The means for fastening, as well as the length of the downwardly extending appendage are matters of design requirement and choice.

The essence of the invention resides in the adjustable relationship between the flexible member and the underlying vertical planar support 21 to which it is fastened. It will be seen, for the first time, that an accurate parabolic support can be constructed by employing this adjustable relationship between these two essential elements.

FIG. 3 is a side view of flexible member 25 showing downwardly extending portions 26, structural rib members 29 and cutout portions 30. The cutouts can be eliminated or modified if the bending modulus of the flexible piece 25 so allows.

FIG. 4 is a cross section showing how the flexible member 25 supports reflective member 27. Ribs 29 or other shapes can help to stabilize top 31.

FIG. 5 shows supports 21 being attached to, and supported by framework 22 in any suitable fashion, with flexible members 25, 25', . . . 25$_n$ added to top edges 23 . . . 23$_n$.

FIG. 6 illustrates a simplified method that is used to construct accurate linear type collectors. Supports 21 mounted on, and carried by, sub-base 22 are supported on a movable table 32 having wheels 33 which ride on tracks 34. Each support 21$_a$ . . . etc., is a series of supports 21$_a$ . . . 21$_n$ positioned in planar parallel alignment with a template 35. The top support portion 31 of flexible member 25 is positioned above top edge 23 of the supports 21$_a$ . . . etc.

In FIG. 6, the downwardly extending tabs 26 and ribs 29 are now shown. Gap 36 (shown more clearly in FIG. 2) can be minimal when the flexible member is placed on top of the support. When flexible member 25 is moved upwardly to butt against parabolically shaped bottom edge 37 of template 35, gap 36 will increase. At this time in the assembly sequence, tabs 26 (not shown in this view) are affixed to planar side portion 27 of supports 21. The now-adjusted and perfectly-shaped parabolic top 25 will support the reflective surface 27.

It is understood that the template can be extended in the direction of the collector axis. Also, with a resilient strip in gap 36, the flexible piece can be positioned above the final adjusted position. Bringing the template down would compress the resilient strip which would be permanently deformed after the flexible piece if fixed in final adjusted (parabolic) location.

After adjustment of the flexible member, template 35 is moved upwardly by cylinders 38 supported by fixed trusswork 39 sufficiently to provide clearance between the bottom edge 37 of template 35 and the top 31 of flexible member 25 which is now fixedly attached to support 21. Table 32 is moved in a direction parallel to fluid pipe 28 until the next support, for example, 21$_b$, is in alignment with the template, and the flexible member 25 is adjusted in coacting relationship with the support 21 in the manner described hereinbefore. The adjusted, fixed coacting relationship thus provides a completed series of spaced parabolically shaped supports upon which the reflective surface 27 rests. Addition of supports 46, 46', fluid pipe 24, 24' and pivot shaft 47, 47' completes the collector assembly.

It is understood that collectors can be made with two or more adjacent concave reflective surfaces, each having a plurality of supports and with adjacent concave upper shapes corrected to a true paraboloid and with flexible pieces added to each concave shape, or to a series of concave shapes, to produce collectors described in my U.S. Pat. No. 4,190,037.

It is further understood that linear type parabolic reflector-concentrating collectors for any use can be constructed with similar parts in a similar manner.

Figure 7:
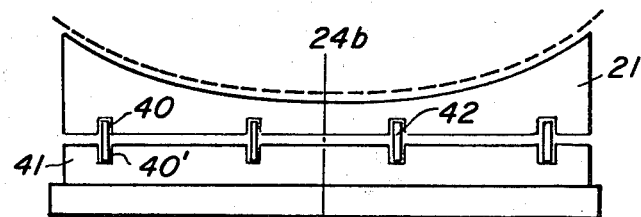
FIG. 7 is an end elevational view of a planar support resting on crossmembers parallel to the axis of the collector.

In FIG. 7, the vertical planar supports 21 are shown as having notches 40 symmetrical about central line 24$_a$–24$_b$. Secondary supports 41 have similar notches 40'. Notches 40, 40' are kept in vertical alignment by insertion of longitudinal strips 42 which can extend the length of the collector. By using longitudinal strips 42, any number of primary upper supports can be installed on top, and thus reduce the distance between consecutive flexible pieces to provide more reflective surface support area.

Figure 8:
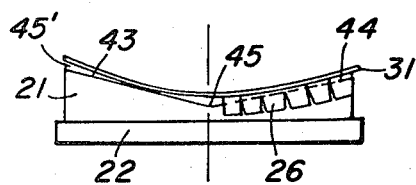
FIG. 8 illustrates how a parabolic curved support surface can be positioned above and displaced from the top of an underlying support having a straight top edge.

In FIG. 8, support 21 has two straight top edges 43, 44 (shown dotted). The top 31 is shown in its final parabolic location—as if it were butted up against a template (not shown). Downwardly extending tabs 26 bridge the gap 45 between the flexible member and the support. Gap 45 can vary from maximum at the center to a lesser amount at the outside, as at 45'. After final positioning of the flexible piece, tabs 26 are attached to supports 21.

Figure 9:
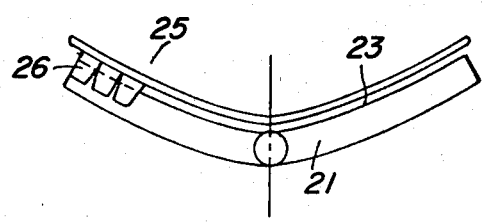
FIG. 9 illustrates another embodiment showing the upper edge of a planar support bent to a curved shape and cooperating with a flexible piece to form a support structure having an accurately shaped upper parabolic support area.

In FIG. 9, the linear collector of another embodiment is shown with supports 21 attached to a central pivot instead of a base (like 22 of FIG. 8). In this instance, the flexible member 25 is cut away on the right side to show that the top edge 23 is curved. When using low density materials, this curved shape can be readily achieved by conventional cutting means, but with metallic supports 21, the top edge 23, (in the absence of flexible member 25) must be cut very precisely. By adding flexible member 25, and utilizing the coacting adjustable relationship between the flexible member and the support, the top edge of support 21 can be bent into a curved shape that approximates the final parabolic shape but can be substantially distant from same. In essence, there is no need for accurate forming, machining or cutting of the top edge of the vertical planar support to true parabolic shape since the flexible member compensates for cutting and assembly inaccuracies.

Figure 10:
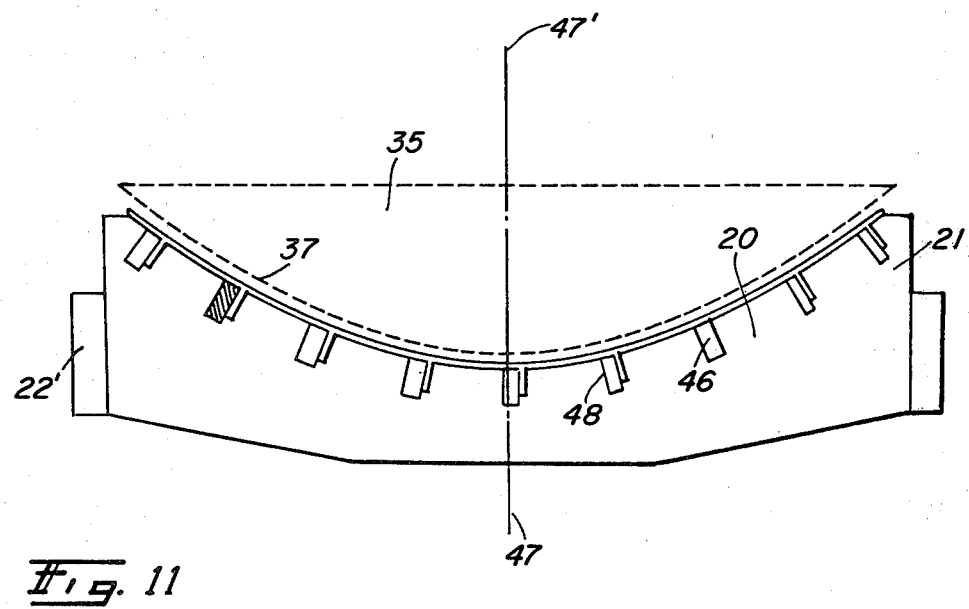
FIG. 10 is a sectional elevational view like FIG. 7 showing crossmembers supported in arcuate fashion and the cooperating use of the flexible piece to achieve parabolic accuracy.

In yet another embodiment shown in FIG. 10, cross-members 42 can extend between any pair of spaced-apart supports 21 placed on a suitable base 22 (not shown) or supported at the ends 22' as in FIG. 10.

Figure 11:
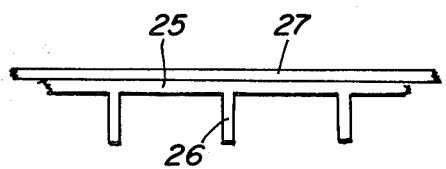
FIG. 11 is a side view of the flexible piece of FIG. 10 wherein downwardly extending tabs are disposed parallel to the axis of the collector.

The support has notches as at 46, said notches accommodating crossmembers 42 arranged with their major center plane parallel to substantially radial lines that converge and coincide at the central focal plane 47—47' of the collector 20. In this manner, the planar sides 48 of said crossmembers are properly oriented so that when the flexible member 25 of FIG. 11 is urged upwardly against the bottom parabolically shaped edge 37 of template 35, the downwardly extending tabs 26' of FIG. 11 will be in substantially planar coincidence with the planar sides 48 of the crossmembers 42 for attachment to same after final parabolic adjustment.

It will be appreciated that other designs are possible with the concept of having spaced intermittent areas of support for the flexible piece, for example upraised "lands" on each of a consecutive series of crossmembers properly aligned in a transverse direction would provide an equivalent.

It is understood that the present invention may be embodied in other specific forms without departing from the spirit or special attributes hereof; and it is, therefore, desired that the present embodiments be considered in all respects as illustrative, and therefore not restrictive, reference being made to the appended claims rather than to the foregoing description to indicate the scope of the invention.

Having thus described my invention, what I claim as new and desire to protect by Letters Patent are the following:

1. A solar energy linear type concentrating collector including:
    a heat collector;
    a parabolic reflector arranged to collect, concentrate, and direct solar rays toward the heat collector,
    heat transfer fluid in contact with said collector at a distance from said reflector,
    said heat collector being conductive and coated with absorptive means for improving heat transfer to said heat transfer fluid and arranged co-incident with the focal line of the parabolic reflector,
    a plurality of spaced supports arranged transversely of the axis of the collector;
    each of said supports having a top surface and also having major side planar surfaces transverse to said axis;
    a flexible member mounted above each of said supports and having tabs in vertical planar contact with the major side surface of said supports, and being vertically slidably adjustable relative thereto;
    said supports and flexible members being adjustable in coacting parabolic relationship;
    said tabs being ultimately fixed to said supports to prevent relative movement therebetween;
    said parabolic reflector being in continuous contact with, and supported by, top surfaces of said flexible members;
    whereby the spaced support and flexible member combination provides intermittent load bearing surfaces for the said reflector.

2. The device of claim 1 wherein said top surface of the support is inclined and forms an angle of less than 90 degrees relative to a vertical plane.

3. The device of claim 2 wherein said top surface is parabolically shaped.

4. The device of claim 2 wherein said supports rest upon a trusslike structure.

5. The device of claim 4 wherein said supports are integral with a trusslike structure.

6. The device of claim 1 wherein the bottom surfaces of said supports are horizontal.

7. The device of claim 1 wherein at least one support rests on a plurality of crossmembers that are parallel to the axis of the collector, said crossmembers being in contacting relationship with at least two of said supports.

8. The device of claim 7 wherein the major planar sides of said crossmembers are substantially vertical and cooperate with downwardly extending tab portions of the flexible member to form a parabolic support structure.

9. The device of claim 1 wherein at least one of said supports is made of non-conductive materials.

10. The device of claim 1 wherein at least one of said supports has a straight top edge.

11. The device of claim 10 wherein a flexible member is upwardly displaced from said straight edge before being secured to said support.

12. The device of claim 11 wherein said flexible member butts against a parabolically shaped template.

13. The device of claim 12 wherein the top surface of said flexible member butts against a linear parabolically shaped reference surface which is parallel to the axis of the collector.

14. The device of claim 1 wherein said transversely extending support rests upon crossmembers that are in contact with at least two underlying parallel supports.

15. The device of claim 14 wherein crossmembers communicate with notches in the upper and lower supports.

16. The device of claim 14 wherein said crossmembers are a series of members parallel to the axis of the collector.

17. The device of claim 1 wherein said supports have curved upper and lower surfaces.

18. The device of claim 1 wherein said supports are fixedly attached to and perpendicular to a pivot member which is parallel to the axis of the collector.

19. The device of claim 18 wherein said pivot member is located centrally.

20. The device of claim 18 wherein said supports are a plurality of co-extensive segments.

21. The device of claim 1 wherein the flexible reflector is a laminate having at least one metallic component.

22. The device of claim 1 wherein the downwardly extending tabs of the flexible members bridge the gaps between the flexible member and a support of any shape.

23. The method of constructing a linear parabolic solar energy collector, including the steps of:
    arranging a plurality of reflective surface supports with major planar sides perpendicular to the axis of the collector, said supports having an inclined upper surface;
    mounting a flexible member above said inclined upper surface of said supports, said flexible member having vertically downwardly extending tabs in contact with said major planar sides of said supports;
    urging said flexible members upwardly against a template having a parabolic shaped bottom edge;
    fixing said flexible member to said supports;
    mounting a reflective surface above said flexible members;
    mounting a heat transfer fluid conduit at the focal line of the parabolic reflective surface so that said reflector-collector structure acts in correlated operation with said absorptively coated fluid conduit.

24. The method of claim 23 wherein the inclined upper surfaces of said supports are curved.

* * * * *